Figure 1:
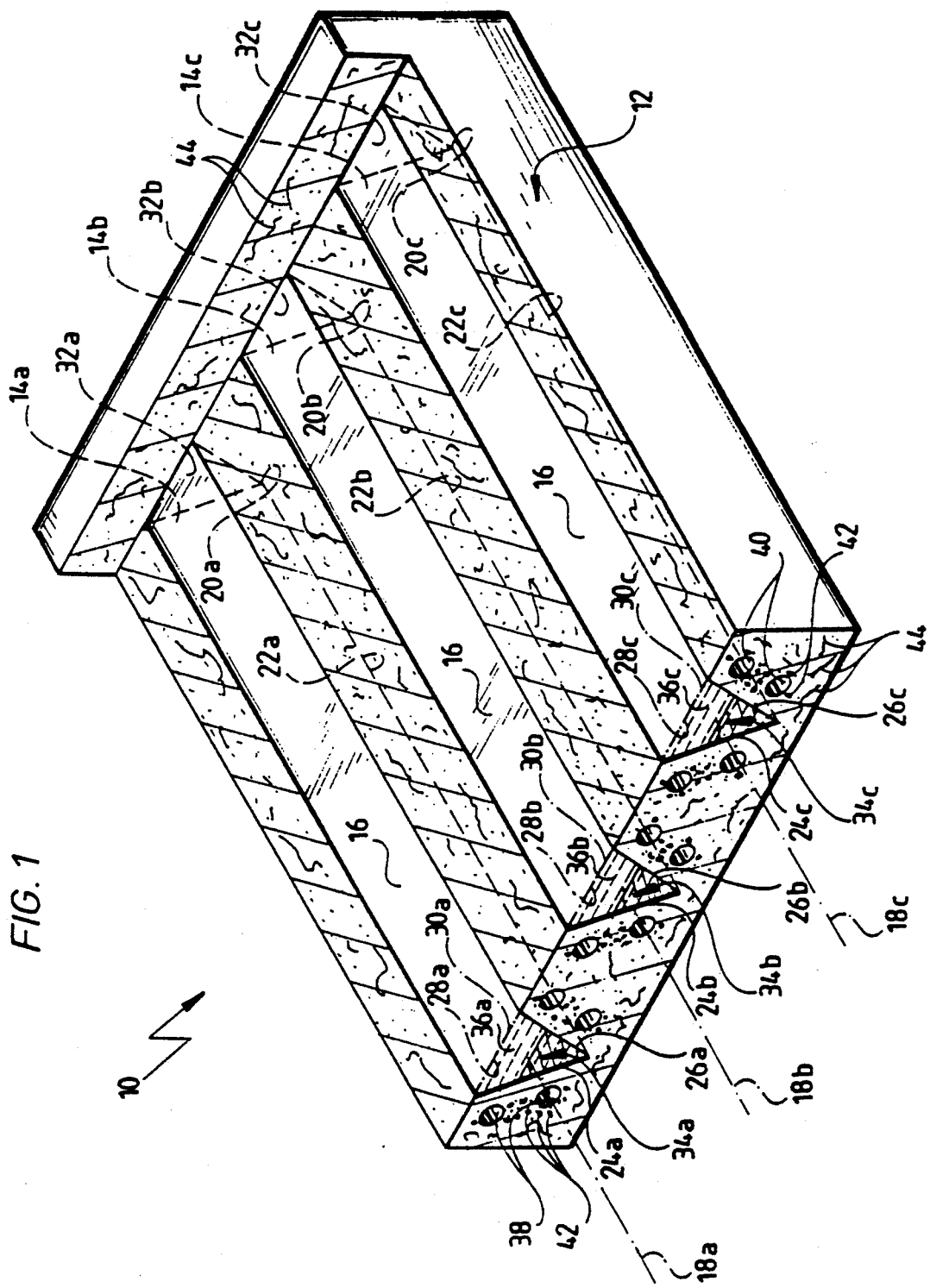

United States Patent [19]
Lindner et al.

[11] Patent Number: 5,217,062
[45] Date of Patent: Jun. 8, 1993

[54] HEAT ACCUMULATOR WITH AN ENLARGING EXPANSION AREA

[75] Inventors: Friedrich Lindner, Leinfelden-Echterdinger; Hans-Joerg Staehle, Filderstadt; Peter Tattermusch, Altdorf, all of Fed. Rep. of Germany

[73] Assignee: Deutsche Forschungsanstalt fuer Luft- und Raumfahrt e.V., Bonn, Fed. Rep. of Germany

[21] Appl. No.: 598,620

[22] PCT Filed: Feb. 16, 1990

[86] PCT No.: PCT/EP90/00249
§ 371 Date: Dec. 7, 1990
§ 102(e) Date: Dec. 7, 1990

[87] PCT Pub. No.: WO90/10186
PCT Pub. Date: Sep. 7, 1990

[30] Foreign Application Priority Data
Feb. 24, 1989 [DE] Fed. Rep. of Germany ....... 3905707

[51] Int. Cl.$^5$ .............................................. F28D 20/00
[52] U.S. Cl. ....................................... 165/10; 165/133
[58] Field of Search ................................. 165/10, 133

[56] References Cited
U.S. PATENT DOCUMENTS
4,241,782 12/1980 Schoenfelder .................... 165/10
4,696,338 9/1987 Jensen et al. .

FOREIGN PATENT DOCUMENTS
158378 10/1985 European Pat. Off. .
2400162 3/1979 France .
8500212 1/1985 PCT Int'l Appl. .
2142135 1/1985 United Kingdom .

OTHER PUBLICATIONS
Japanese Patent Application Abstract, Application No. 58-153263, Patent Abstracts of Japan, M-399, Jul. 24, 1985, vol. 9.
Patent Abstracts of Japan, vol. 8, No. 166 (M-314) (1603), Aug. 2, 1984; and JP, A 5960185 (Toshiba K.K.) Apr. 6, 1984.

Primary Examiner—Albert W. Davis, Jr.
Attorney, Agent, or Firm—Barry R. Lipsitz

[57] ABSTRACT

The invention concerns a thermal storage unit with a storage container having an internal space for holding a storage medium, the internal space including a solidification zone, in which the storage medium is located following a solidification process, and an expansion zone, in which the storage medium can expand during the melting process. In order to improve this thermal storage unit so that the mechanical loads are reduced, permitting the storage container to have a simpler, cheaper constructional design, it is proposed that the storage container wall surfaces in contact with the storage medium are made of a material which is not wetted by the storage medium.

21 Claims, 2 Drawing Sheets

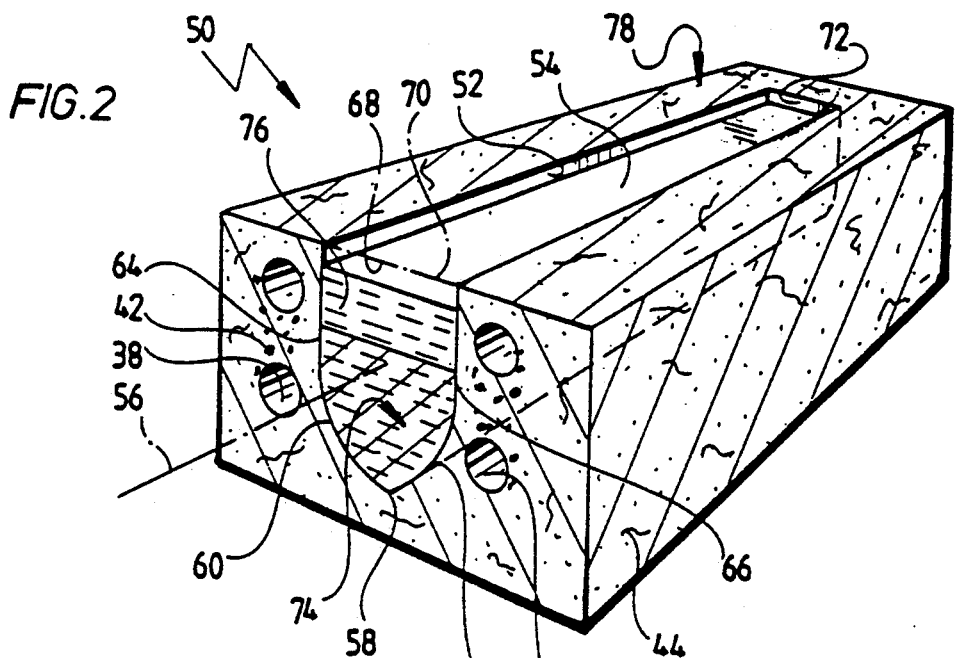
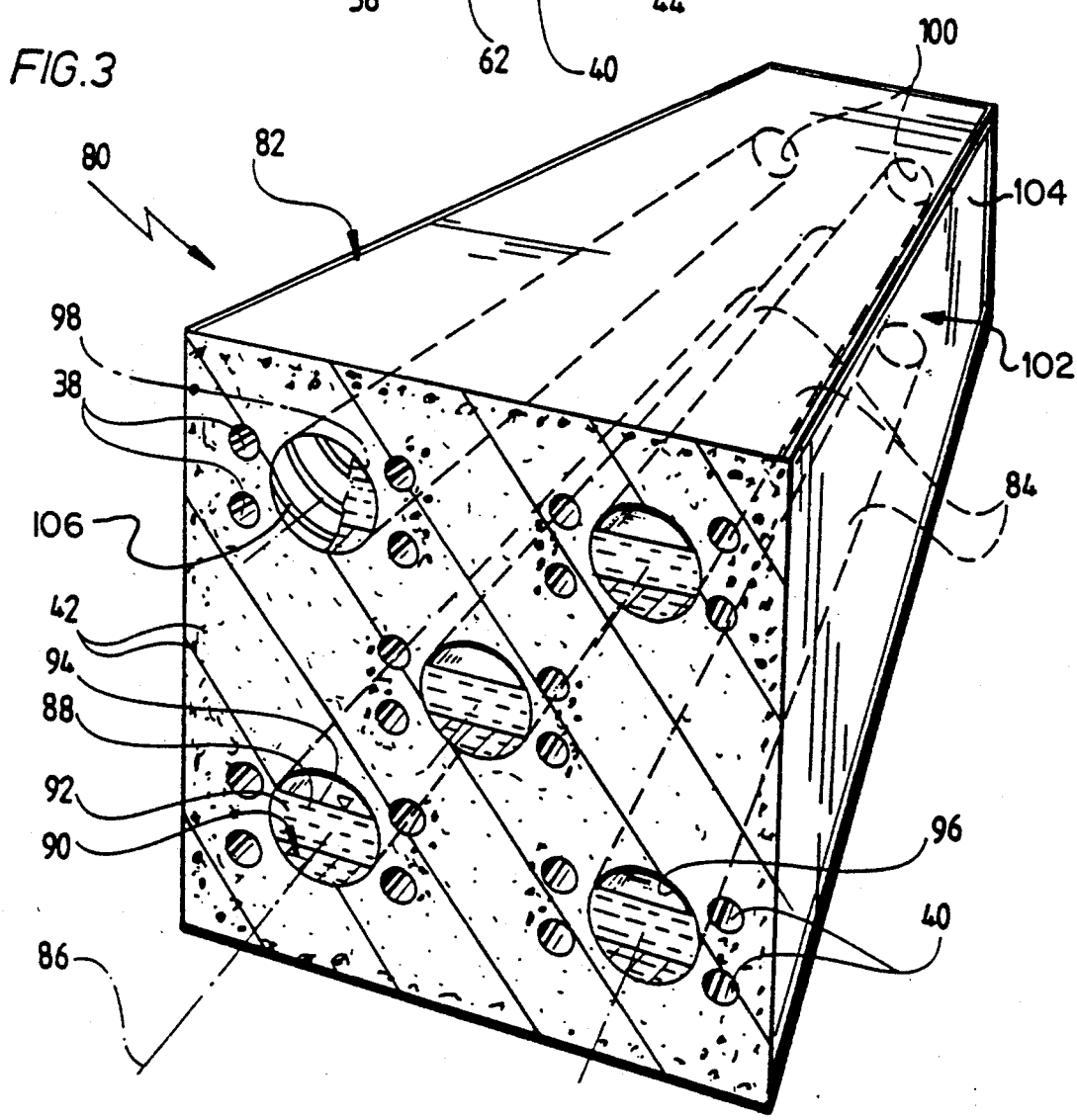

HEAT ACCUMULATOR WITH AN ENLARGING EXPANSION AREA

The invention relates to a heat accumulator comprising a storage container having an interior space for accommodating storage medium, with the interior space including a solidification area in which the storage medium is located following a solidification process and an expansion area in which the storage medium can expand during the melting process.

Such heat accumulators are known. Herein, high-purity nickel, high-alloy steels, nickel-cobalt or nickel-cobalt alloys or nickel-niobium alloys are used as container materials. The problem with such storage containers is that the volume of the storage medium increases in the order of magnitude of from 20 to 30% during the transition from the solidified to the completely liquid state. This results in mechanical problems, above all, during the charging of such a heat accumulator as the storage medium immediately adjacent to the storage container starts to melt in the area of wall surfaces of the storage container and expands with respect to its volume by the aforesaid amount but is prevented by the core of still solidified storage medium located above it from expanding into the cavities formed during the solidification. Consequently, such storage containers are subjected to high mechanical stresses owing to the pressure increase during the charging cycle. Problems are also caused by the corrosion of the materials from which the storage containers are made and, therefore, in all, only storage containers with walls of very thick and sturdy design can be used, but this makes such a heat accumulator unattractive.

The object underlying the invention is, therefore, to so improve a heat accumulator of the kind described at the beginning that low mechanical stresses occur and hence the storage container can be of structurally simpler and cheaper design.

This object is accomplished in accordance with the invention with a storage container of the kind described at the beginning by wall surfaces of the storage container adjacent to the storage medium being made of a material which is not wettable by the storage medium.

Hence the advantage of the inventive solution is to be seen in that the solidified storage medium is prevented from adhering to the wall surfaces by a choice of material for the wall surfaces which is not wettable by the storage medium, that at the beginning of the charging process, i.e., at the beginning of the liquefaction of the storage medium, the possibility is created for the increase in volume of the liquefying storage medium to be compensated by the core of still solidified storage medium being displaced relative to the wall such that the liquefied storage medium can enter the expansion area so that, in the end, no or only slight mechanical forces act upon the storage container. Therefore, the storage container can be of mechanically considerably less sturdy and simpler and hence also less expensive design.

It is particularly advantageous for the solidification area to widen towards the expansion area, i.e., to exhibit an increasingly larger cross-section in the direction towards the expansion area. Hence in addition to the lack of adherence of the storage medium to the wall surfaces, the widening of the solidification area towards the expansion area causes the core of still solidified storage medium to became displaced at the beginning of the charging process and the liquefied storage medium to enter the expansion area.

Within the scope of the present invention, it has proven particularly advantageous for the solidification area to widen conically towards the expansion area.

In order to also prevent the still existing, firm core of solidified storage material from tilting during the displacement, thereby possibly causing at least for a short time until further solidified storage medium has liquefied, an increase in pressure in the area of the liquefying storage medium, it is particularly advantageous for the part of the expansion area adjoining the solidification area to have essentially at least the same cross-section as a transition from the solidification area to the expansion area so no cross-sectional contraction occurs in the part of the expansion area adjoining the solidification area.

The simplest possibility of implementing such a heat accumulator makes provision for the entire interior space to have a shape which tapers conically towards the solidification area.

To ensure in the present heat accumulator that solidification of the storage medium always occurs in the solidification area, provision is advantageously made for an exchange of heat with the storage medium to take place essentially via the wall surfaces of the solidification area.

Such heat exchange via the wall surfaces of the solidification area is possible in a multitude of ways. For example, the wall surfaces of the solidification area as a whole can have a heat carrier medium flow around them on their side opposite the storage medium. The simplest solution from a structural viewpoint is, however, for channels for a heat carrier medium to be associated with the wall surfaces of the solidification area.

In the description of the embodiments so far, nothing was said about the extent to which the interior space is to be filled with storage medium. The interior space is preferably filled with completely liquid storage medium to the extent that the solidified storage medium fills the solidification area completely.

Nor have any details been given as to the dimensions of the expansion area. It is particularly advantageous for the volume of the expansion area to be at least 30% of the volume of the solidification area so as to ensure that the expansion area can fully accommodate the completely liquid storage medium.

In the description of the embodiments so far, it was not discussed in detail whether the interior space includes further free areas of volume aside from the expansion area and the solidification area. Optimal exploitation of the interior space is achieved by the interior space being formed by the expansion area and the solidification area. A heat accumulator as described above can be further optimized with respect to its storage capacity by the interior space being substantially filled with completely liquid storage medium so the expansion area comprises precisely that volume by which the solidified storage medium expands during the transition from the solidified to the liquid state.

In the description of the embodiments so far, no details were given as to which material the storage container is to be made of. It has proven advantageous in view of the material for the wall surfaces not being wettable by the storage medium, for this to be graphite and, therefore, the wall surfaces comprise graphite. It is particularly advantageous for the wall surfaces to consist essentially of graphite. In order to also improve the heat conductivity of the storage container, above all, of the wall areas of the storage container, provision is made for metals to be embedded in a wall of the storage container carrying the wall surface.

Furthermore, the mechanical stability of the storage container can be further increased by ceramic fibers being embedded in a wall of the storage container carrying the wall surface.

Since the wall surfaces are already preferably made of graphite, it is also advantageous for a wall of the storage container carrying the wall surface to comprise graphite.

Aside from the wall surfaces being made of graphite, it has also proven advantageous for the wall surfaces to comprise carbon fibers, with the carbon fibers likewise not being wettable by the storage medium. Here, it is particularly expedient for the wall surfaces to consist substantially of carbon fibers.

In order to give the storage medium which has already become liquid during the liquefaction of the storage medium the possibility of escaping from the solidification area, provision is advantageously made for the wall surfaces to comprise connecting channels leading from the solidification area to the expansion area.

The connecting channels are advantageously of such design that facing wall surfaces of the connecting channels are spaced from one another to such an extent that the storage medium does not enter these to any considerable degree in the fully liquid state owing to the capillary forces.

The advantage of this solution is to be seen in that all kinds of corrosion damage are prevented by the wall surface being made of a material which is not wettable by the storage medium and, in addition, the connecting channels create additional volume which the storage medium does not penetrate to any considerable degree in the completely liquid state and hence does also not penetrate in the solidified state, but it can penetrate it against the action of the capillary forces and can get into the expansion area when in the course of the melting process the molten portion of the storage medium is under increased pressure owing to the increase in volume, and so the storage container is not subjected to increased pressure forces.

The dimensions of the connecting channels are preferably chosen such that the recesses exhibit in at least one direction a wall surface spacing which is less than approximately 6 mm. Such dimensions are fully adequate, above all, when the storage medium is not subjected to any gravitational forces. It is more advantageous for the spacing of the wall surfaces to be less than approximately 4 mm. Optimal values are obtained with spacings between the wall surfaces of less than approximately 2 mm, preferably less than approximately 1 mm. The last-mentioned values are of significance, particularly with the occurrence of gravitational forces acting on the storage medium as the capillary forces then have to be large enough to also counteract these.

In an embodiment in which the wall surfaces are made of carbon fibers, it is similarly expedient for the wall of the storage container carrying the wall surface to comprise carbon fibers which likewise ensure an increased mechanical stability of the wall.

To ensure that the heat accumulator is resistant to its environment, in particular, air and/or is gas-tight, provision is made for outside surfaces of the heat accumulator to be coated with one or several protective layers of metal and/or ceramics. In this context, outside surfaces are to be understood as surfaces not facing the storage medium.

In particular, a storage medium which does not react chemically with the material of the wall surfaces results in an advantageous embodiment of the inventive heat accumulator as the latter exhibits a high long-term stability.

An advantageous storage medium is, for example, aluminum.

Preferred storage media are also salts and salt hydrates or eutectics comprising these.

The inventive concept offers special advantages with respect to the storable energy when alkali halides or alkaline-earth halides or eutectics comprising these are used as storage medium as these highly reactive materials are particularly well suited for use in a heat accumulator with wall surfaces according to the invention which are not wettable by the storage medium, without corrosion occurring on the wall surfaces.

Further features and advantages of the invention are the subject matter of the following description and the drawings of several embodiments. The drawings show:

FIG. 1 a perspective, partly sectional illustration of a first embodiment;

FIG. 2 a partial illustration of a second embodiment; and

FIG. 3 a perspective partial illustration of a third embodiment.

FIG. 1 shows a first embodiment designated in its entirety 10 of an inventive heat accumulator with a storage container 12 in which several identical interior spaces 14a, b, c are arranged for accommodating a storage medium 16, in particular, alkali halides or alkaline-earth halides or their eutectics.

Each of these interior spaces 14a to c is an elongate, cylindrical channel with a triangular cross-section. A longitudinal axis 18a, b, c of each of the cylindrical interior spaces 14a, b, c extends substantially horizontally so the triangular cross-sectional area extends perpendicularly to the longitudinal axis 18a, b, c and hence in the vertical direction. The interior spaces 14a, b, c are, furthermore, arranged such that a tip 20a, b, c of the triangular cross-section forms the lowest point of the interior spaces 14a, b, c so the bottom edge 22a, b, c associated with this tip and extending parallel to the longitudinal axis 18a, b, c includes the lowest points of the interior spaces 14a, b, c.

In the case of each of the interior spaces 14a, b, c, there extend upwards from these bottom edges 22a, b, c two wall surfaces 24a, b, c and 26a, b, c which include an acute angle with one another and are joined by a top wall surface 28a, b, c. In addition, each interior space 14a, b, c is closed off by front and rear end faces 30a, b, c and 32a, b, c.

In the first embodiment 10, the entire interior space 14a, b, c is filled with the storage medium 16 which in the completely liquid state, therefore, also occupies the entire volume of the interior space 14a, b, c, as indicated by the horizontal lines in FIG. 1.

In the solidified state, however, the volume of the storage medium 16 is approximately 20 to 30% less so the solidified storage medium 16, illustrated by hatching in FIG. 1, settles in an area of the volume of the interior space 14a, b, c facing the tip 20a, b, c and thereby occupies approximately 80 to 70% of the entire volume of the interior space 14a, b, c. The area of the volume of the interior space 14a, b, c in which the storage medium 16 solidifies is designated in accordance with the invention solidification area 34*a*, *b*, *c*. This solidification area 34*a*, *b*, *c* is formed by wall surface sections 24*a*, *b*, *c*, 26*a*, *b*, *c*, 30*a*, *b*, *c* and 32*a*, *b*, *c*.

The remaining area of the volume of the interior space 14*a*, *b*, *c* aside from the solidification area 34*a*, *b*, *c* is designated expansion area 36*a*, *b*, *c*.

In the first embodiment 10, there are provided in the storage container 12 in addition to the interior spaces 14*a*, *b*, *c*, channels 38, 40 which extend parallel to the longitudinal axes 18*a*, *b*, *c* of the interior spaces 14*a*, *b*, *c* and are preferably associated with the wall surfaces 24*a*, *b*, *c* and 26*a*, *b*, *c*, i.e., extend in spaced relation to the latter and parallel to the longitudinal axis 18*a*, *b*, *c* along the latter.

A heat exchanger medium with which heat can be selectively fed to or removed from the storage medium 16 flows in these channels 38, 40.

Channels 38 and 40 are preferably associated with the sections of the wall surfaces 24*a*, *b*, *c* and 26*a*, *b*, *c* belonging to the solidification area 34*a*, *b*, *c*.

The storage container 12 of the first embodiment is made in its entirety of graphite, with the wall surfaces 24*a*, *b*, *c*, 26*a*, *b*, *c*, 28*a*, *b*, *c*, 30*a*, *b*, *c* and 32*a*, *b*, *c* facing the storage medium 16 being made of pure graphite, while metal particles 42 are added to the graphite in the rest of the material forming the walls of the storage container, preferably in the area of channels 38, 40 and wall surfaces 24*a*, *b*, *c* and 26*a*, *b*, *c* to increase the heat conduction of the graphite. In addition, ceramic fibers 44 are added to the graphite material of the entire storage container to increase the mechanical stability.

The first embodiment of the inventive storage container functions in such a way that starting from the storage medium 16 in the completely liquid state, heat is removed from the storage medium 16 by a heat exchanger medium flowing through the channels 38, 40 so the storage medium 16 starts to solidify and owing to the action of gravity and/or the main heat removal in the wall surfaces 24*a*, *b*, *c* and 26*a*, *b*, *c* belonging to the solidification area 34*a*, *b*, *c* solidifies in the solidification area 34*a*, *b*, *c* and fills it out.

During the reheating of this solidified storage medium 16, the portion of the storage medium in solidification area 34*a*, *b*, *c* facing the wall surfaces 24*a*, *b*, *c* and 26*a*, *b*, *c* melts first, whereas a solidified core of storage medium still remains firm at the center. The increase in volume occurring during this in the order of magnitude of 20 to 30% is compensated by the remaining, still solidified portion of the storage medium being displaceable upwards out of the solidification area 34*a*, *b*, *c* into the expansion area 36*a*, *b*, *c* to the extent to which the volume of the liquefied storage medium increases in the area of the wall surfaces 24*a*, *b*, *c* and 26*a*, *b*, *c* owing to the fact that the storage medium 16 does not wet the wall surfaces 24*a*, *b*, *c* and 26*a*, *b*, *c*, 30*a*, *b*, *c* and 32*a*, *b*, *c* and the wall surfaces 24*a*, *b*, *c* and 26*a*, *b*, *c* include an acute angle with one another. Therefore, since the still solidified core of the storage medium always has the possibility of escaping into the expansion area, there is no danger of the storage container 12 being acted upon by large forces as a result of the increase in volume during the liquefaction of the storage medium 16 which would have to be brought under control by a special mechanical construction.

In a second embodiment designated in its entirety 50 of the inventive heat accumulator, only one interior space 2 accommodating the storage medium 54 is illustrated. This interior space 52 likewise extends with its longitudinal axis 56 in the horizontal direction. The interior space 52 is likewise designed as cylinder but with a cross-section which extends upwards from a tip 58 forming a lowest point of the interior space with wall surfaces 60 and 62 bent in parabolic-like shape which, in turn, pass into straight and substantially vertically extending wall surfaces 64 and 66 which are then, in turn, joined by a substantially horizontally extending wall surface 68. At the end faces, the interior spaces 52 are then joined by front and rear wall surfaces 70 and 72.

In the second embodiment, a solidification area 74 of the interior space 52 is delimited by the parabolic wall surfaces 60 and 62 extending upwards from the tip 58 and by sections of the front and rear wall surfaces 70 and 72, i.e., such an amount of storage medium 54 is present in the interior space 52 that in the solidified state, it fills out the solidification area 74 completely. The expansion area 76 located above the solidification area is of larger dimensions than the additional area of volume which is required in addition to the solidification area 74 when the storage medium 54 is completely liquid so that, in all, the interior space 52 is not filled completely. This expansion area 76 is delimited by sections of the wall surfaces 64 and 66 and of the front and rear wall surfaces 70 and 72.

The second embodiment functions, in principle, in exactly the same way as the first embodiment but with the difference that the expansion area 76 is not also conical. However, since the wall surfaces 64 and 66 are substantially vertical in this area, i.e., extend parallel to one another, there is likewise the possibility that the core of solidified storage medium left over from the melting can be displaced upwards into the expansion area 76 and hence no additional forces act on the storage container designated in its entirety 78 owing to the increase in volume of the storage medium 54 during the transition from the solidified to the liquid state.

Aside from that, the storage container 78 is made of the same materials as the storage container 12 of the first embodiment 10 and so reference is to be had to the statements thereon in connection with the first embodiment.

A third embodiment designated in its entirety 80 of the inventive heat accumulator comprises a storage container 82 in which interior spaces 84 with a circular-cylindrical cross-section are provided and a longitudinal axis 86 of the interior spaces 84 likewise extends horizontally. The interior spaces 84 are, however, only filled with storage medium 88 to the extent that in the solidified state, the latter fills out a cylinder segment 90 which is substantially less than half of the cylinder space 84 of circular cross-section cut parallel to the longitudinal axis 86. This cylinder segment 90 simultaneously forms the solidification area of the interior space 84. The expansion area located above the solidification area similarly does not correspond to the entire interior space 84, but to a further cylinder segment 92 so a liquid surface 94 of the storage medium 88 in the completely liquid state lies above the longitudinal axis 86 and hence the solidification area 90 and the expansion area 92 occupy somewhat more than half of the entire interior space 84.

In this way, during the melting of the solidified storage medium 88, the still solidified core of the latter can be displaced out of the solidification area 90 into the expansion area 92 owing to the wall surfaces 96 of the cylindrical interior space 84 widening upwards in the direction opposite to the direction of gravity.

In contrast with the first and second embodiments, the wall surfaces 96 and front and rear wall surfaces 98, 100 of the interior space 84 consist of pure carbon fibers, while walls of the storage container 82 preferably also comprise metal particles to improve the heat conductivity.

Aside from that, the third embodiment 80 functions in exactly the same way as the first and second embodiments 10 and 50 and so reference is to be had to the descriptions of these.

To protect the storage container 82, outside surfaces 102 thereof are galvanically coated with a metal layer 104.

It is particularly expedient within the scope of the inventive solution—as illustrated by way of example in the third embodiment 80—for connecting channels 106 in the form of grooves to lead from the solidification area 90 to the expansion area 92 in the wall surfaces 96. Walls of the grooves are likewise preferably made of a material which is not wettable by the storage medium and comprise facing wall surfaces which are spaced from one another to such an extent that the storage medium does not enter these to any substantial degree in the completely liquid state on account of the capillary forces.

In order to prevent, for example, the alkali halides and alkaline-earth halides or their eutectics acting as storage medium from penetrating the grooves 106 in the completely liquid state without additional force acting thereon, the facing groove wall surfaces are spaced from one another by an amount which is less than approximately 6 mm, preferably 2 mm. As a result of such spacing of the groove wall surfaces, the storage medium does not penetrate the grooves to any considerable degree in the completely liquid or completely solidified state owing to its surface tension and the fact that it does not wet the wall surface 96. Penetration only occurs when in the course of the liquefaction of the storage medium, still solidified storage medium prevents the storage medium which has already become liquid from flowing off.

We claim:

1. Heat accumulator comprising a storage container having an interior space for accommodating a storage medium, said interior space including a solidification area in which the storage medium is located following a solidification process and an expansion area in which the storage medium can expand during the melting process, wherein:
   wall surfaces of said storage container adjacent to said storage medium are made of a material comprising graphite which is not wettable by said storage medium, whereby said storage medium shrinks away from said wall surfaces when it solidifies.

2. Heat accumulator as defined in claim 1, characterized in that said solidification area widens towards said expansion area.

3. Heat accumulator as defined in claim 2, characterized in that said solidification area widens conically towards said expansion area.

4. Heat accumulator as defined in claim 2, characterized in that the part of said expansion area (36, 76, 92) adjoining said solidificiation area (34, 54, 90) has essentially at least the same cross-section as a transition from said solidification area to said expansion area.

5. Heat accumulator as defined in claim 2, characterized in that said entire interior space has a shape which tapers conically towards said solidification area.

6. Heat accumulator as defined in claim 1, characterized in that a heat exchange takes place with said storage medium essentially via said wall surfaces of said solidification area.

7. Heat accumulator as defined in claim 6, characterized in that channels for a heat carrier medium are associated with said wall surfaces of said solidification area.

8. Heat accumulator as defined in claim 1, characterized in that said interior space is filled with completely liquid storage medium to such an extent that said solidified storage medium fills out said solidification area completely.

9. Heat accumulator as defined in claim 1, characterized in that the volume of said expansion area is at least approximately 30% of the volume of said solidification area.

10. Heat accumulator as defined in claim 1, characterized in that said interior space is formed by said expansion area and said solidification area.

11. Heat accumulator as defined in claim 10, characterized in that said interior space is substantially filled with completely liquid storage medium.

12. Heat accumulator as defined in claim 1, characterized in that metals are embedded in a wall of said storage container carrying said wall surface.

13. Heat accumulator as defined in claim 1, characterized in that outside surfaces thereof are coated with at least one of at least one of a metal and ceramic material.

14. Heat accumulator comprising a storage container having an interior space for accommodating a storage medium said interior space including a solidification area in which the storage medium is located following a solidification process and an expansion area in which the storage medium can expand during the melting process, wherein:
   wall surfaces of said storage container adjacent to said storage medium are made of a material which is not wettable by said storage medium, and
   ceramic fibers are embedded in a wall of said storage container carrying said wall surfaces.

15. Heat accumulator comprising a storage container having an interior space for accommodating a storage medium, said interior space including a solidification area in which the storage medium is located following a solidification process and an expansion area in which the storage medium can expand during the melting process, wherein:
   wall surface of said storage container adjacent to said storage medium are made of a material which is not wettable by said storage medium, and
   a wall of said storage container carrying said wall surface comprises graphite.

16. Heat accumulator comprising a storage container having an interior space for accommodating a storage medium, said interior space including a solidification area in which the storage medium is located following a solidification process and an expansion area in which the storage medium can expand during the melting process, wherein:
   wall surfaces of said storage container adjacent to said storage medium are made of a material which is not wettable by said storage medium, and
   said wall surfaces comprise carbon fibers.

17. Heat accumulator comprising a storage container having an interior space for accommodating a storage medium, said interior space including a solidification area in which the storage medium is located following a solidification process and an expansion area in which the storage medium can expand during the melting process, wherein:
- wall surfaces of said storage container adjacent to said storage medium are made of a material which is not wettable by said storage medium, and
- said wall surfaces comprise connecting channels leading from said solidification area to said expansion area.

18. Heat accumulator comprising a storage container having an interior space for accommodating a storage medium, said interior space including a solidification area in which the storage medium is located following a solidification process and an expansion area in which the storage medium can expand during the melting process, wherein:
- wall surfaces of said storage container adjacent to said storage medium are made of a material which is not wettable by said storage medium, and
- a wall of said storage container carrying said wall surfaces comprises carbon fibers.

19. Heat accumulator comprising:
- a storage container having an interior space for accommodating a storage medium, said interior space including a solidification area in which the storage medium is located following a solidification process and an expansion area which widens away from said solidification area and in which the storage medium can expand during the melting process,
- wherein wall surfaces of said storage container adjacent to said storage medium are made of a material which is not wettable by said storage medium; and
- said storage medium in a solidification state is displaceable away from said solidification area into said expansion area due to the widening of said expansion area away from said solidification area.

20. Heat accumulator in accordance with claim 19 wherein said wall surfaces comprise graphite.

21. Heat accumulator in accordance with claim 19 wherein said wall surfaces comprise carbon fibers.

* * * * *